Aug. 11, 1936.  H. G. JACKSON  2,050,702
BRAKE ACTUATING MECHANISM
Filed July 30, 1934
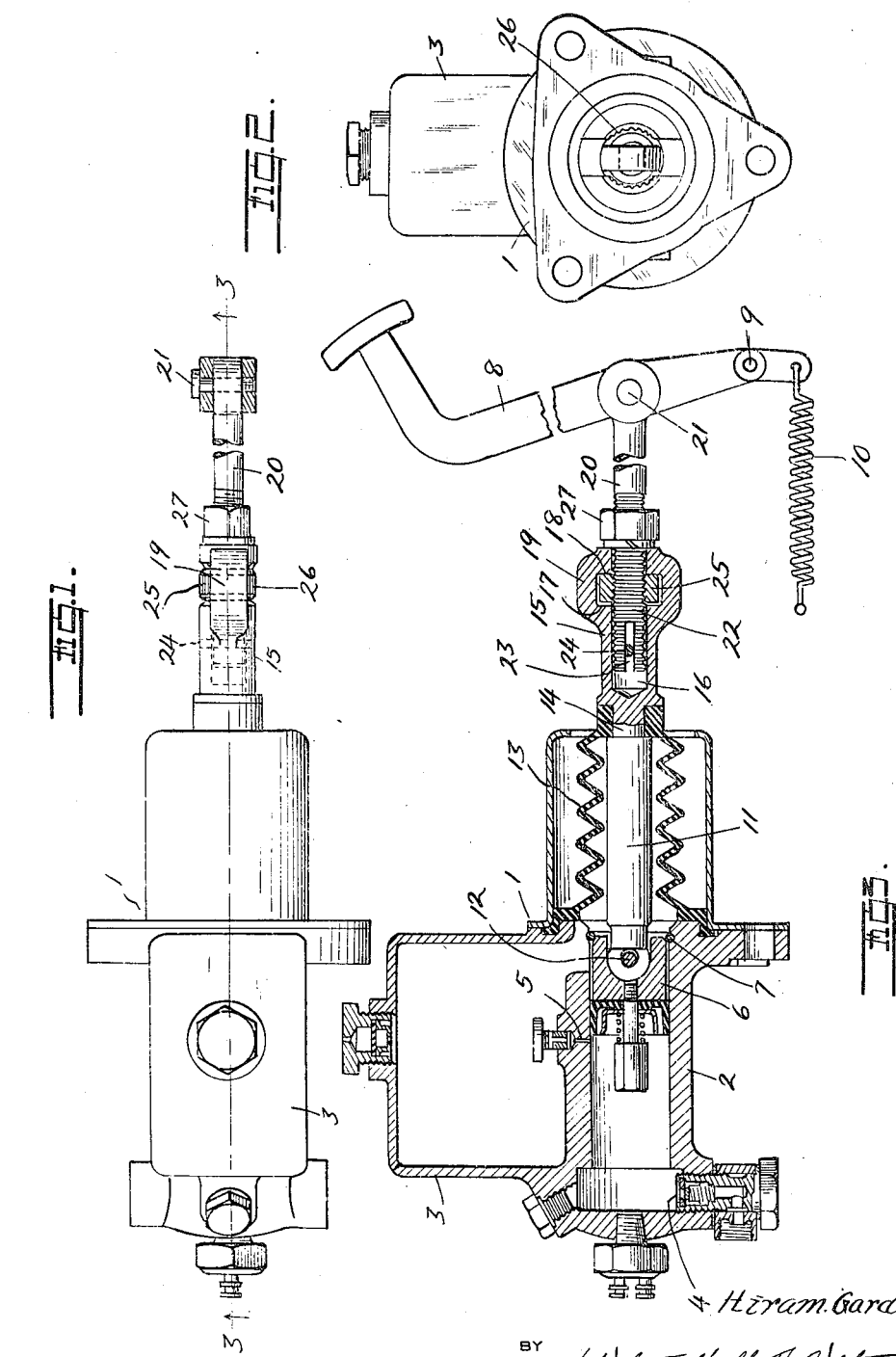
INVENTOR
Hiram Gardner Jackson
BY
Whittemore Hulbert Whittemore Belknap
ATTORNEYS Patented Aug. 11, 1936

2,050,702

UNITED STATES PATENT OFFICE 2,050,702

BRAKE ACTUATING MECHANISM

Hiram Gardner Jackson, Birmingham, Mich., assignor, by mesne assignments, to General Motors Corporation, a corporation of Delaware Application July 30, 1934, Serial No. 737,661

3 Claims. (Cl. 188—196)

The invention relates to brake actuating mechanism of the hydraulic type and has for one of its objects to provide an improved connection between the piston of the master cylinder and the brake lever so arranged that it may be quickly and easily adjusted to locate the brake lever when in its off position in predetermined relation to the foot boards of the motor vehicle to which the brake actuating mechanism is applied. The invention has for another object to so construct the connection that it may be adjusted without disturbing the parts and without injuring the flexible sealing boot which is secured to the casing of the master cylinder and the connection. These and other objects of the invention will become apparent from the following description, taken in connection with the accompanying drawing, in which Figure 1 is a plan view of a brake actuating mechanism showing an embodiment of my invention;

Figure 2 is an end view thereof;

Figure 3 is a cross section on the line 3—3 of Figure 1.

The brake actuating mechanism is of the hydraulic type and is designed for use in motor vehicles. This mechanism comprises the casing 1 having the master cylinder 2 and the reservoir 3 above the master cylinder. The outlet 4 of the master cylinder is connected in any usual manner to the brake actuators or wheel cylinders and this master cylinder is also adapted to be placed in communication with the reservoir 3 by the restricted port 5 when the piston 6 is in its retracted position. This retracted position is determined by engagement of the piston with the stop 7, which latter is preferably in the nature of a transversely split ring secured in an annular groove in the casing. 8 is the brake lever which, as shown, is a brake pedal pivotally mounted upon the chassis frame by the horizontal pin 9. The portion of the brake lever below the pin 9 is connected to the retractile coil spring 10 which serves to normally hold the brake lever in its off position and the piston 6 in its retracted position against the stop 7, the brake lever and piston being connected to each other.

11 is a rod forming part of the connection, this rod being pivotally connected at one end to the piston 6 by the horizontal pin 12 providing for angular movement of the rod through a vertical path. 13 is a flexible sealing boot preferably formed of rubber which encircles the rod 11 and which is secured to the reduced portion 14 of this rod and also to the casing 1 to effectively prevent escape of braking fluid out of the casing past the rod. The rod 11 has the enlarged end portion 15 which is provided with the axially extending recess 16 and with the shoulders 17 and 18 which are spaced longitudinally of the recess. These shoulders are in effect formed in the upper and lower furcations 19 of the enlarged portion 15. 20 is a second rod or clevis which is pivotally connected to the brake lever 8 above the pivot 9 by the horizontal pin 21. This second rod has the externally threaded end part 22 which extends freely into the recess 16 and this end part is provided with the longitudinally extending slot 23 through which extends the pin 24 secured in the enlarged portion 15 of the rod 11. 25 is a nut which extends between the shoulders 17 and 18 and is threaded upon the part 22, this nut being peripherally serrated at 26 to facilitate its rotation whereby the rod 20 may be adjusted relative to the rod 11.

From the above description, it will be readily seen that the proper position of the brake lever when in its off position relative to the floor boards of the motor vehicle may be readily secured by rotating the nut 25 to either move the rod 20 into or out of the recess 16 formed in the rod 11, the check nut 27 during this operation being in released position. It will also be seen that the adjustment of the rods relative to each other may be readily carried out, since the opposite sides of the nut 25 are readily accessible. It will be further seen that the adjustment may be carried out without possibility of rotating the rod 11 relative to the rod 20, so that danger of damaging the flexible boot 13 and especially its sealing connection with the rod 11 or the casing 1 is avoided.

What I claim as my invention is:

1. In brake actuating mechanism, the combination with a master cylinder and a piston therewithin and a brake lever, of a rod operatively connected to said piston and having a longitudinally extending recess and shoulders spaced longitudinally of said recess, a second rod operatively connected to said brake lever and having a part freely extending into said recess, cooperating means upon said rods for holding the same from relative rotation, and means securing the rods together including a member engaging the part aforesaid of the second rod between the shoulders on the first named rod and adjustable relative to the second rod in either direction axially of the rods to alternately cooperate with the shoulders in increasing and reducing the effective length of the rods.

2. In brake actuating mechanism, the combination with a master cylinder and a piston therewithin and a brake lever, of a rod pivotally connected to said piston and having an enlarged end portion formed with an axially extending recess and also formed with shoulders spaced longitudinally of said recess, a second rod pivotally connected to said brake lever and having an externally threaded part extending freely into said recess, one of said rods being provided with a longitudinally extending slot and a pin carried by the other of said rods and slidably engaging said slot, and a nut extending between said shoulders and threaded on said part for adjustably securing said rods together, said enlarged end portion having an opening providing access to said nut.

3. In brake actuating mechanism, the combination of a casing having a master cylinder, a piston slidable within said cylinder, a brake lever pivotally mounted to swing through a vertical path, a rod pivotally connected to said piston and adapted to swing through a vertical path, a sealing boot encircling and secured to said rod and having sealing engagement with said rod and casing, said rod having an enlarged end portion formed with an axially extending recess and shoulders spaced longitudinally of said recess, a second rod pivotally connected to said brake pedal and having an externally threaded part extending freely into said recess, said part having a longitudinally extending slot, a member upon said enlarged portion slidably engaging said slot, and a nut extending between said shoulders and threaded on said part for adjustably securing said rods together.

HIRAM GARDNER JACKSON.